United States Patent
Nagori et al.

(10) Patent No.: US 11,051,046 B2
(45) Date of Patent: Jun. 29, 2021

(54) METHOD AND APPARATUS FOR NOISE REDUCTION IN VIDEO SYSTEMS

(71) Applicant: Texas Instruments Incorporated, Dallas, TX (US)

(72) Inventors: Soyeb Nagori, Bangalore (IN); Shyam Jagannathan, Bangalore (IN); Deepak Kumar Poddar, Bangalore (IN); Arun Shankar Kudana, Bangalore (IN); Pramod Swami, Bangalore (IN); Manoj Koul, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/988,978

(22) Filed: Aug. 10, 2020

(65) Prior Publication Data
US 2020/0374564 A1    Nov. 26, 2020

Related U.S. Application Data

(63) Continuation of application No. 14/337,669, filed on Jul. 22, 2014, now abandoned.

(30) Foreign Application Priority Data

Jul. 22, 2013    (IN) ........................... 3248/CHE/2013

(51) Int. Cl.
*H04N 19/86* (2014.01)
*H04N 19/176* (2014.01)
(Continued)

(52) U.S. Cl.
CPC ........... *H04N 19/86* (2014.11); *H04N 19/117* (2014.11); *H04N 19/139* (2014.11); *H04N 19/176* (2014.11); *H04N 19/82* (2014.11)

(58) Field of Classification Search
None
See application file for complete search history.

(56) References Cited

U.S. PATENT DOCUMENTS

| 5,659,365 | A  | 8/1997 | Wilkinson |
| 8,184,200 | B1 | 5/2012 | Biswas et al. |

(Continued)

FOREIGN PATENT DOCUMENTS

WO    WO2013049412 A2    4/2013

*Primary Examiner* — Jeffery A Williams
(74) *Attorney, Agent, or Firm* — Ebby Abraham; Charles A. Brill; Frank D. Cimino

(57) ABSTRACT

The disclosure provides a noise filter. The noise filter includes a motion estimation (ME) engine. The ME receives a current frame and a reference frame. The current frame comprising a current block and the reference frame includes a plurality of reference blocks. The ME engine generates final motion vectors. The current block comprises a plurality of current pixels. A motion compensation unit generates a motion compensated block based on the final motion vectors and the reference frame. The motion compensated block includes a plurality of motion compensated pixels. A weighted average filter multiplies each current pixel of the plurality of current pixels and a corresponding motion compensated pixel of the plurality of motion compensated pixels with a first weight and a second weight respectively. The weighted average filter generates a filtered block. A blockiness removal unit is coupled to the weighted average filter and removes artifacts in the filtered block.

15 Claims, 2 Drawing Sheets

(51) Int. Cl.
*H04N 19/117* (2014.01)
*H04N 19/139* (2014.01)
*H04N 19/82* (2014.01)

(56) References Cited

U.S. PATENT DOCUMENTS

| | | |
|---|---|---|
| 9,131,073 B1 | 9/2015 | Bankoski et al. |
| 2002/0011094 A1 | 8/2002 | Bottreau |
| 2005/0063475 A1 | 3/2005 | Bhaskaran |
| 2006/0023788 A1 | 2/2006 | Otsuka et al. |
| 2006/0056724 A1 | 3/2006 | Le Dinh et al. |
| 2006/0222074 A1 | 10/2006 | Zhang |
| 2008/0089417 A1 | 4/2008 | Bao et al. |
| 2008/0204600 A1* | 8/2008 | Xu .................... H04N 5/21 348/607 |
| 2010/0091194 A1 | 4/2010 | Lei et al. |
| 2010/0309378 A1 | 12/2010 | Zhong |
| 2011/0090960 A1 | 4/2011 | Leontaris et al. |
| 2012/0257113 A1 | 10/2012 | Hsu et al. |

\* cited by examiner

METHOD AND APPARATUS FOR NOISE REDUCTION IN VIDEO SYSTEMS

CROSS REFERENCES TO RELATED APPLICATIONS

[0001] This application is a continuation of U.S. patent application Ser. No. 14/337,669, filed Jul. 22, 2014, and claims priority from India provisional patent application No. 3248/CHE/2013 filed on Jul. 22, 2013, both of which are hereby incorporated by reference in their entirety.

TECHNICAL FIELD

Embodiments of the disclosure relate generally to noise filters and more particularly to a noise filter implemented using a video compression engine.

BACKGROUND

A noise filter is an essential component in a video system to ensure a high quality video. Also, when the noise filter is used in a video compression engine, it reduces a bitrate significantly to provide a high quality video. In vision systems, the noise filter improves accuracy of underlying vision algorithms. Noise is random in nature and various noise models are available to characterize different kinds of noise. Averaging and filtering techniques are prominently used to remove many of these kinds of noise. Traditionally, spatial filtering and temporal filtering have been used to remove noise.

Spatial filtering involves filtering around pixels in a frame using pixels in the frame while temporal filtering involves filtering around pixels in a frame using pixels in the frame and in neighboring frames. There are two types of temporal filters which are most commonly used for reducing noise in the video systems. These are MATNF (motion adaptive temporal noise filter) and MCTNF (motion compensated temporal noise filter). MATNF class of filters have various shortcomings, such as: (a) inability to clean noise especially in medium to high noise; (b) distortion in areas with motion (motion region) when strong filtering is performed; (c) blurring of sequences with high resolution. MCTNF generates better video quality and does more effective filtering than MATNF. However, MCTNF has much higher computational complexity.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

An embodiment provides a noise filter. The noise filter includes a motion estimation (ME) engine. The ME receives a current frame and a reference frame. The current frame comprising a current block and the reference frame includes a plurality of reference blocks. The ME engine generates final motion vectors. The current block comprises a plurality of current pixels. A motion compensation unit is coupled to the ME engine and generates a motion compensated block based on the final motion vectors and the reference frame. The motion compensated block includes a plurality of motion compensated pixels. A weighted average filter multiplies each current pixel of the plurality of current pixels and a corresponding motion compensated pixel of the plurality of motion compensated pixels with a first weight and a second weight respectively. The product of the current pixels and the first weight is summed with the product of the corresponding motion compensated pixels and the second weight to generate a filtered block. A blockiness removal unit is coupled to the weighted average filter and removes artifacts in the filtered block.

Other aspects and example embodiments are provided in the Drawings and the Detailed Description that follows.

BRIEF DESCRIPTION OF THE VIEWS OF DRAWINGS

DETAILED DESCRIPTION OF THE EMBODIMENTS

Figure 1:
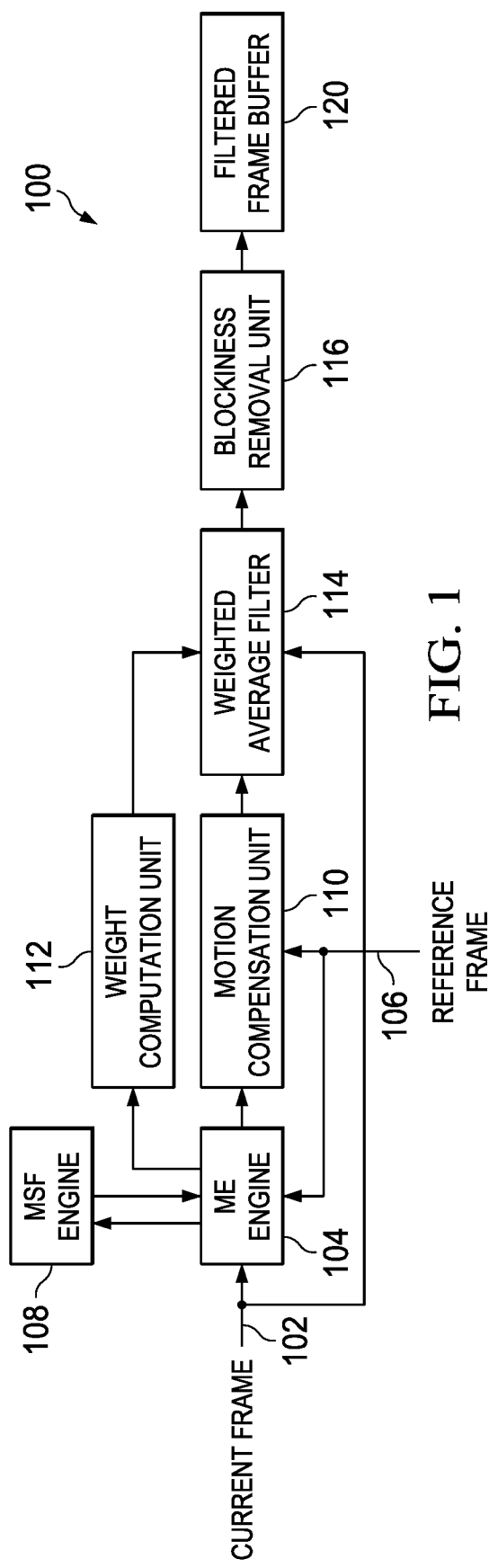
FIG. 1 illustrates a block diagram of a noise filter, according to an embodiment.

FIG. 1 illustrates a block diagram of a noise filter 100, according to an example embodiment. The noise filter 100 includes a motion estimation (ME) engine 104. The ME engine 104 receives a current frame 102 and a reference frame 106. A motion smoothness factor (MSF) engine 108 is coupled to the ME engine 104. A motion compensation unit 110 is coupled to the ME engine 104. The motion compensation unit 110 also receives the reference frame 106. A weighted average filter 114 is coupled to the motion compensation unit 110. The weighted average filter 114 also receives the current frame 102. A weight computation unit 112 is coupled to the ME engine 104 and the weighted average filter 114. A blockiness removal unit 116 is coupled to the weighted average filter 114. A filtered frame buffer 120 is coupled to the blockiness removal unit 116.

The operation of the noise filter 100 illustrated in FIG. 1 is explained now. The noise filter 100 is being initiated to process the current frame 102. The ME engine 104 receives the current frame 102 and the reference frame 106. A plurality of frames is received by the noise filter 100 and the plurality of frames includes the current frame 102 and the reference frame 106. Each frame of the plurality of frames includes a plurality of non-overlapping macroblocks and each macroblock includes a plurality of blocks. The current frame 102 includes a current block and the reference frame 106 includes a plurality of reference blocks. In one example, the reference frame 106 is a frame received before the current frame 102 that is filtered by the noise filter 100 to generate the reference frame 106. The current block includes a plurality of current pixels and each reference block of the plurality of reference blocks includes a plurality of reference pixels.

The ME engine 104 performs a motion search for each macroblock of the plurality of non-overlapping macroblocks in the current frame 102. In one example, the current frame 102 is of 1920×1080 pixels and each macroblock is of 16×16 pixels. The ME engine 104 performs motion searches with 16×16 macroblocks. Also, the ME engine 104 performs a book-keep for each block of the set of blocks in the macroblock. In the above example, each macroblock of 16×16 pixels includes 4 blocks of 8×8 pixels. Thus, the ME engine 104 book-keep at 8×8 blocks to estimate four distinct motion vectors for each macroblock.

During the motion search, a macroblock of the current frame 102 is compared with a macroblock of the reference frame 106 and a set of motion vectors corresponding to each block in the macroblock of the current frame 102 are stored by the ME engine 104. The motion vectors provide a location of a reference block with respect to the current block. In one example, the motion vector of the plurality of motion vectors represents a shift of an area to be matched in the reference frame 106 and the current frame 102. The motion vectors are utilized for representing vectors corresponding to a horizontal and a vertical shift of a specific block between the reference frame 106 and the current frame 102.

The ME engine 104 performs multiple motion searches to compare the macroblock of the current frame 102 with a set of macroblocks in the reference frame 106. The ME engine 104 therefore generates a plurality of motion vectors.

In one embodiment, the ME engine 104 uses multiple reference frames for generating the plurality of motion vectors. In an example, the multiple reference frames includes frames received before the current frame 102 and frames received after the current frame 102.

The ME engine 104 is configured to estimate a sum of absolute difference (SAD) between the current block and a reference block of the plurality of reference blocks in the reference frame 106. The SAD is estimated by adding absolute value of differences between a current pixel and a corresponding reference pixel over all the pixels of the current block and the reference block respectively. Thus, the ME engine 104 estimates a plurality of SAD corresponding to the current block as the ME engine 104 estimates SAD between the current block and each reference block of the plurality of reference blocks.

The ME engine 104 also estimates motion vector cost (MVcost) between the current block and a reference block. The motion vector cost (MVcost) is estimated from the motion vectors associated with the current block. The motion vector cost (MVcost) is defined as:

$$MVcost = MVbits(MVx, MVy) \qquad (1)$$

Where, (MVx,MVy) are the motion vectors associated with the current block and MVbits is an imaginary value of bits of the differential value of the motion vectors (MVx,MVy) in the x and y direction respectively with respect to predicted motion vectors. In one embodiment predicted motion vectors are decided based on motion vectors of blocks adjacent to the current block.

The motion smoothness factor (MSF) engine 108 estimates a motion smoothness value (MSV) corresponding to the current block. The MSV is defined between a maximum MSV and a minimum MSV. The MSV is estimated from the current noise level as illustrated in equation 2.

$$MSV = \frac{\text{Minimum } MSV \times \text{Current Noise level}}{\text{Minimum Noise level}} \qquad (2)$$

As illustrated in equation 2, when current noise level is equal to the minimum noise level, the MSV is equal to the minimum MSV. As the current noise level increases, MSV increases till it saturates to the maximum MSV. In one example, a value of the maximum MSV is defined as (192*blocksize/64) and a value of the minimum MSV is defined as (24*blocksize/64), where blocksize is a size of the current block. In one example, when the current block is an 8×8 pixel block, the blocksize is 64.

The current noise level is estimated between the current frame 102 and the reference frame 106 by averaging SAD for all blocks with motion vectors below a predefined threshold. In an example, the current noise level is estimated between the current frame 102 and the reference frame 106 by averaging SAD for all blocks with motion vectors (MVx,MVy) defined as <0,0>. Therefore, in the above example, the current noise level is represented as $$\text{Current Noise level} = \frac{\sum_{\text{blocks with } MVx \, \& \, Mvy=\langle 0,0 \rangle} SAD}{\text{Total blocks with } MVx \, \& \, MVy = \langle 0,0 \rangle} \qquad (3)$$

In the above example, the blocks with motion vectors (MVx,MVy) defined as <0,0> are considered for estimating the current noise level as the SAD in other blocks may be due to motion and thus, the SAD will not be true representation of noise.

In one example, the MSV is equal to the minimum MSV when a sum of the motion vectors associated with the current block and the motion vectors associated with a set of adjacent blocks is above a predefined threshold. In one embodiment, adjacent blocks are spatial neighbor blocks and/or temporal neighbor blocks of the current block. Whenever information from spatial neighbor blocks is not available due to processing in a raster scan format, temporal neighbor blocks from a previous frame are utilized. The noise filter 100 receives the previous frame followed by current frame 102.

The ME engine 104 estimates a cost function (J) between the current block and a reference block. The cost function (J) is estimated by summing the SAD between the current block and the reference block and a product of the MSV and the motion vector cost between the current block and the reference block. Thus, the cost function (J) is defined as:

$$J(MVx, MVy) = SAD(MVx, MVy) + (MSV * MVbits(MVx, MVy)) \qquad (4)$$

During a motion search, the current block is compared with a reference block, the ME engine 104 estimates a motion vector cost between the current block and the reference block and also estimates the SAD between the current block and the reference block. The MSF engine 108 estimates the motion smoothness value (MSV) corresponding to the current block. Thereafter, the ME engine 104 utilizes these values to obtain the cost function (J) as illustrated in equation 4.

The ME engine 104 estimates the cost function (J) between the current block and each reference block of the plurality of reference blocks in the reference frame 106. In one example, the ME engine 104 estimates the cost function (J) between the current block and a set of reference blocks of the plurality of reference blocks in the reference frame 106. The ME engine 104 selects a final SAD and final motion vectors associated with the current block corresponding to a reference block of the plurality of reference blocks for which the cost function (J) is minimum.

For example, the cost function (J) between the current block and a first reference block is J1 and the cost function (J) between the current block and a second reference block is J2. The reference frame 106 includes the first reference block and the second reference block. Thus when J1 is less than J2, the ME engine 104 selects the SAD and the motion vectors corresponding to J1 which are referred as the final SAD and the final motion vectors corresponding to the current block.

The final motion vectors are divided by two to obtain chrominance motion vectors (cMVx, cMVy). However, when the final motion vectors are odd, a last bit of the final motion vectors is masked with zero before dividing by two. Thus, the chrominance motion vectors (cMVx, cMVy) obtained are integers. Interpolation for chrominance SAD is thus avoided because it provides marginal improvement in removing noise but comes with significant computational complexity.

The ME engine 104 estimates a chrominance SAD between the current block and the reference block using the chrominance motion vectors (cMVx, cMVy). The chrominance SAD is a SAD for a chrominance block (Cb block and Cr block) which corresponds to the current block. In one example, when the current block is 8×8 pixels, the chrominance components Cb and Cr are of 4×4 pixels. The chrominance motion vectors (cMVx, cMVy) are utilized to estimate SAD for every 4×4 block which is further used to compute the chrominance SAD.

The ME engine 104 estimates a combined SAD associated with the current block by summing the final SAD and the chrominance SAD. The weight computation unit 112 receives the combined SAD associated with the current block from the ME engine 104. The weight computation unit 112 estimates a first weight (W1) and a second weight (W2) using the combined SAD associated with the current block, an average combined SAD associated with the previous frame and a blending factor. The noise filter 100 receives the previous frame followed by current frame 102. Each block of the previous frame is associated with a combined SAD. An average of combined SAD associated with all the blocks in the previous frame provides the average combined SAD associated with the previous frame. The first weight (W1) is estimated as follows $$W1 = \frac{\exp(-\beta)}{\exp(-\beta) + \exp(-r)} \quad (5)$$

Where, β is the blending factor and r is defined as $$r = \frac{\text{Combined } SAD \text{ associated with the current block}}{\text{Average combined } SAD \text{ associated with the previous frame}} \quad (6)$$

The second weight (W2) is estimated as follows $$W2 = 1 - W1 \quad (7)$$

In one implementation, piecewise linear approximation of exponential function is used in the weight computation unit 112 to estimate the first weight (W1) and the second weight (W2). For example, when a range of r is from 0 to 8, it is divided into 9 regions and a region is defined between two numbers such as a first region is defined between 0 and 1, a second region is defined between 1 and 2 and so on. Similarly, a last region will account for r>8. For each region, a straight line is fitted instead of exponential as an approximation. This reduces the error in estimation of the first weight (W1) and the second weight (W2) and also can be implemented with very low computational complexity as compared to traditional floating point implementation.

A block is marked as zero block when the motion vectors of the block is <0,0>, otherwise it is marked as non-zero block. When a number of zero blocks adjacent to the current block is above a threshold, the current block is a static block otherwise the current block is a motion block. The blending factor (β) for the motion block is lower than the blending factor (β) for the static block. The blending factor (β) is defined between a maximum blending factor (β) and a minimum blending factor (β). In one example, the blending factor (β) for the motion block is equal to the minimum blending factor (β) and the blending factor (β) for the static block is between the maximum blending factor (β) and the minimum blending factor (β). In another example, for the static block, the blending factor (β) increases in steps from the minimum blending factor (β) to the maximum blending factor (β). For example, min_β, min_β+δ, min_β+2δ till max_β, where δ is a step increase in β, min_β is the minimum blending factor and max_β is the maximum blending factor.

The motion compensation unit 110 receives the final motion vectors from the ME engine 104 and also receives the reference frame 106. The motion compensation unit 110 generates a motion compensated block based on the final motion vectors and the reference frame 106. The motion compensated block includes a plurality of motion compensated pixels.

The weighted average filter 114 receives: (a) motion compensated pixels from the motion compensation unit 110; (b) the plurality of current pixels corresponding to the current block; and (c) the first weight (W1) and the second weight (W2) from the weight computation unit 112. The weighted average filter 114 multiply each current pixel of the plurality of current pixels and a corresponding motion compensated pixel of the plurality of motion compensated pixels with a first weight (W1) and a second weight (W2) respectively.

The product of the current pixels and the first weight (W1) is summed with the product of the corresponding motion compensated pixels and the second weight (W2) to generate a filtered block. The filtered block includes a plurality of filtered pixels. A filtered pixel (f) is represented as:

$$f = \frac{p0 \times W1 + p1 \times W2 + 2^{\log Wd}}{2^{\log Wd+1}} \quad (8)$$

where, p0 is the current pixel and p1 is the motion compensated pixel. W1 is the first weight and W2 is the second weight. log Wd is used in equation 8, to increase the precision of weights W1 and W2. In one example, a value of log Wd is 6, as it can be used to represent weights up to one with maximum precision.

It is to be noted that in above equation, when the first weight W1 is multiplied with a current pixel, the second weight W2 is multiplied with a corresponding motion compensated pixel at the corresponding position in the motion compensated block. In an embodiment, the weighted average filter 114 is implemented on a motion compensation accelerator in a video compression engine.

The filtered block is received by the blockiness removal unit 116 that removes artifacts in the filtered block. In an example, the blockiness removal unit 116 is a de-blocking filter. A set of parameters are associated with the de-blocking filter such as (but not limited to) quantization parameter, inter mode, intra modes and motion vector. A set of the parameters associated with the de-blocking filter are adjusted to perform at least one of a strong filtering, moderate filtering and weak filtering. In one example, the set of parameters are adaptively selected based on the noise present in the filtered block. The blockiness removal unit 116 after filtering provides the filtered block to the filtered frame buffer 120. The filtered frame buffer 120 stores the filtered block. The filtered frame buffer 120 stores all the filtered blocks corresponding to the current frame 102. The filtered blocks corresponding to the current frame 102 together form a filtered frame.

The noise filter 100 in one embodiment is a motion compensated temporal noise filter (MCTNF). In one example, the noise filter 100 is mapped to a video compression engine. In another example, the noise filter 100 is mapped to video encoding accelerators. Indeed, those skilled in the art will appreciate that building blocks of noise filter 100 overlaps building blocks of a video compression engine and the processes defined earlier in the description have been adapted to suit hardware blocks of the video compression engine. The noise filter 100 utilizes available resources of a video compression engine and also provides high video quality. The noise filter 100 finds application in any video processing systems such as, but not limited to, video surveillance devices, and computer vision systems. The noise filter 100 is of lesser computational complexity as compared to MATNF and provides a better video quality than MCTNF.

Figure 2:
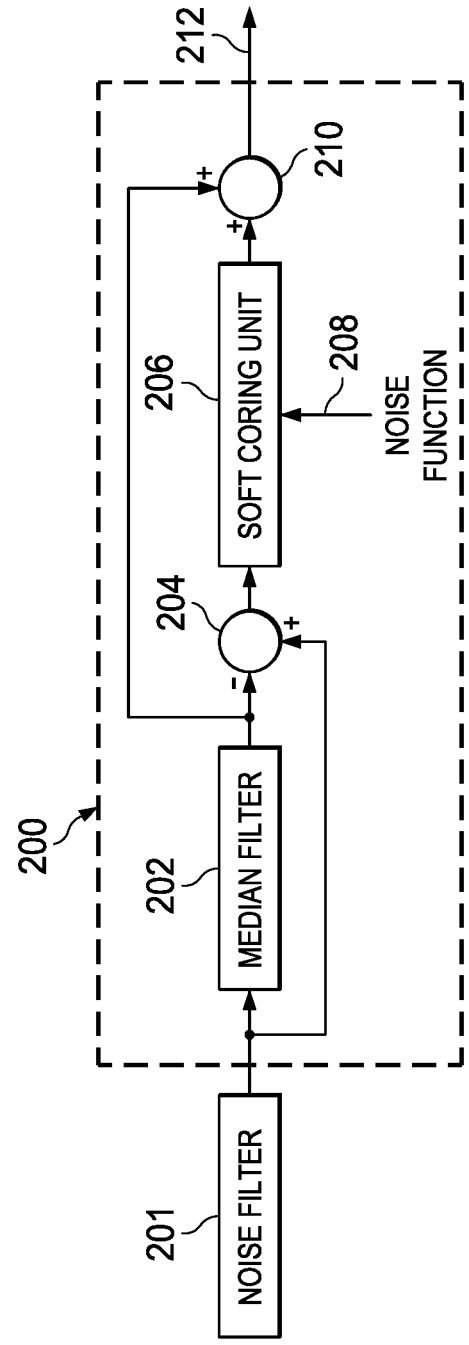
FIG. 2 illustrates a spatial filter, according to an embodiment.

FIG. 2 illustrates a spatial filter 200 according to an embodiment. The spatial filter 200 is coupled to the noise filter 201. The noise filter 201 is similar in connection and operation to the noise filter 100 (as illustrated in FIG. 1). The spatial filter 200 includes a median filter 202 that is coupled to the noise filter 201. In one example, the median filter 202 is an N×N median filter, where N is an integer. In another example, the median filter 202 is a 3×3 median filter. A subtractor 204 is coupled to the median filter 202. A soft coring unit 206 is coupled to the subtractor 204 and receives a noise function (σ) 208. The soft coring unit 206 is coupled to an adder 210.

The median filter 202 receives a filtered pixel of the plurality of filtered pixels from the noise filter 201. The noise filter 201 generates a filtered block and each block includes a plurality of filtered pixels. The median filter 202 generates a median pixel on receiving the filtered pixel. The subtractor 204 subtracts the median pixel from the filtered pixel to generate a subtracted pixel. The soft coring unit 206 receives the subtracted pixel and the noise function (σ) 208. The noise function (σ) 208 is estimated from a current noise level. The current noise level is obtained as illustrated in equation 3.

The soft coring unit 206 performs a soft coring function which is defined as $$f(x) = x\left[1 - \exp\left\{\left(\frac{x}{2\sigma}\right)^2\right\}\right] \quad (9)$$

where f(x) represents an output of the soft coring unit 206 and x represents an input to the soft coring unit 206. The input to the soft coring unit 206 is the subtracted pixel. The soft coring unit 206 performs soft coring function on the subtracted pixel and generates an adjusted pixel. The adder 210 sums the adjusted pixel and the median pixel to generate a spatial filtered pixel.

The spatial filter 200 performs filtering on each filtered pixel received from the noise filter 201 and generates a corresponding spatial filtered pixel. The spatial filter 200 is used to remove any noise left over in the noise filter 201. The spatial filter 200 in one example suppresses amplitudes below a threshold and preserves high amplitudes.

Figure 3:
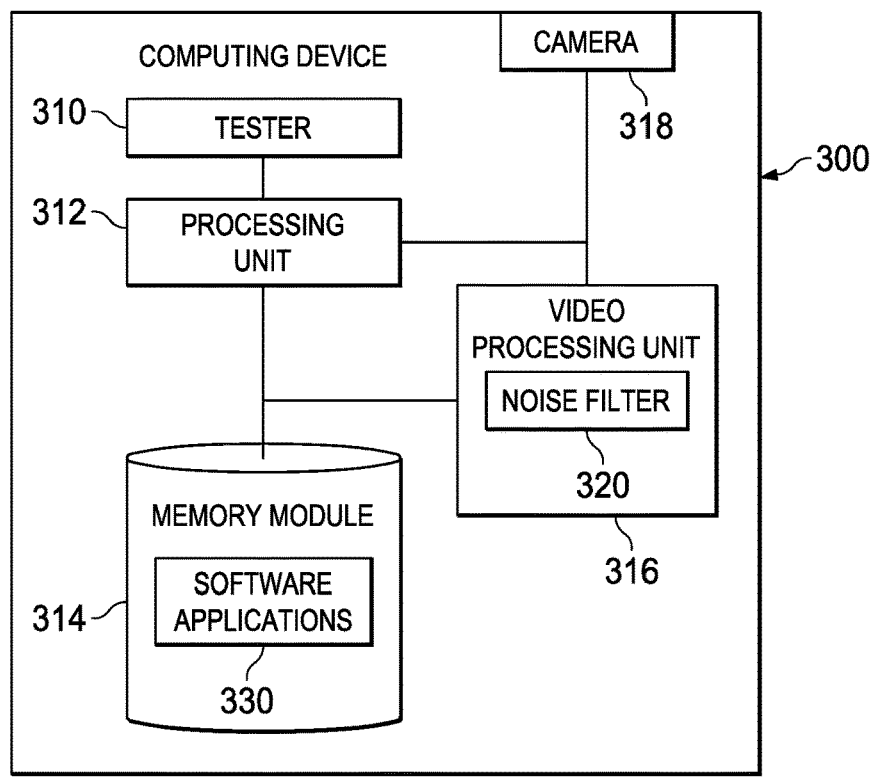
FIG. 3 illustrates a computing device, according to an embodiment.

FIG. 3 illustrates a computing device 300 according to an embodiment. The computing device 300 is, or is incorporated into, a mobile communication device, such as a mobile phone, a personal digital assistant, a transceiver, a personal computer, or any other type of electronic system. The computing device 300 may include one or more additional components known to those skilled in the relevant art and are not discussed here for simplicity of the description.

In some embodiments, the computing device 300 comprises a megacell or a system-on-chip (SoC) which includes a processing unit 312 such as a CPU (Central Processing Unit), a memory module 315 (e.g., random access memory (RAM)) and a tester 310. The processing unit 312 can be, for example, a CISC-type (Complex Instruction Set Computer) CPU, RISC-type CPU (Reduced Instruction Set Computer), or a digital signal processor (DSP). The memory module 315 (which can be memory such as RAM, flash memory, or disk storage) stores one or more software applications 330 (e.g., embedded applications) that, when executed by the processing unit 312, performs any suitable function associated with the computing device 300. The tester 310 comprises logic that supports testing and debugging of the computing device 300 executing the software applications 330. For example, the tester 310 can be used to emulate a defective or unavailable component(s) of the computing device 300 to allow verification of how the component(s), were it actually present on the computing device 300, would perform in various situations (e.g., how the component(s) would interact with the software applications 330). In this way, the software applications 330 can be debugged in an environment which resembles post-production operation.

The processing unit 312 typically comprises memory and logic which store information frequently accessed from the memory module 315. A camera 318 is coupled to the processing unit 312. The computing device 300 includes a video processing unit 316. The video processing unit 316 is coupled to the processing unit 312, the memory module 314 and the camera 318. The video processing unit 316 includes noise filter 320. The noise filter 320 is analogous to the noise filter 100 in connection and operation. The image/video data shot by the camera 318 is processed in the video processing unit 316. The video data in the computing device 300 is processed using the noise filter 320 as in any of the embodiments discussed previously in this description. The noise filter 320 overlaps building blocks of a video compression engine and the processes defined earlier in the description have been adapted to suit hardware blocks of the video compression engine. The noise filter 320 utilizes available resources of a video compression engine and also provides high video quality.

Figure 4:
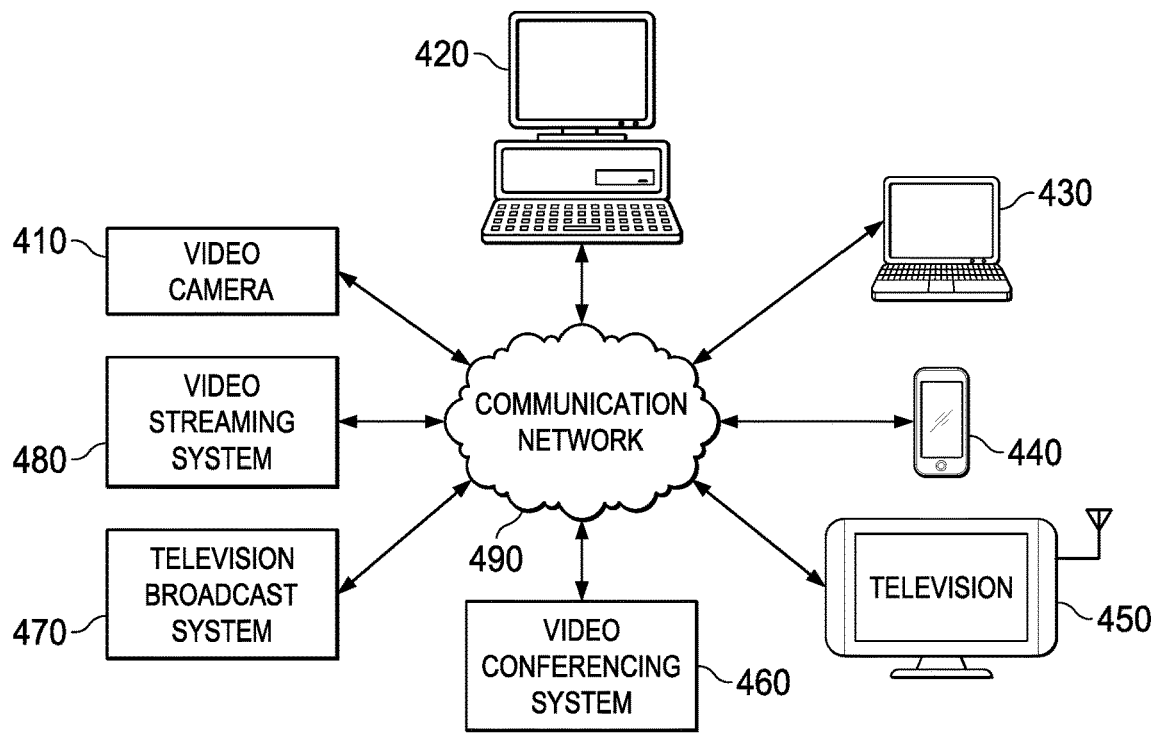
FIG. 4 is an example environment in which various aspect of the present disclosure may be implemented.

FIG. 4 is an example environment in which various aspects of the present disclosure may be implemented. As shown, the environment may comprise, for example, one or more video cameras 410, computers 420, personal digital assistants (PDA) 430, mobile devices 440, televisions 450, video conference systems 460, video streaming systems 480, TV broadcasting systems 470 and communication networks/channels 490.

The video cameras 410 are configured to take continuous pictures and generate digital video, a signal comprising sequence of image frames. The video cameras 410 are configured to process the image frames for efficient storage and/or for transmission over the communication networks/channels 490. The computers 420, PDAs 430 and the mobile devices 440 are configured to encode the video signals for transmission and to decode encoded video signals received from the communication networks/channels 490. The video streaming systems 480 is configured to encode video signal and to transmit the encoded video signals over the communication networks/channels 490 responsive to a received request and/or asynchronously. The television broadcasting systems 470 are configured to process video signals in accordance with one or more broadcast technologies and to broadcast the processed video signals over the communication networks/channels 490. The video conference systems 460 are configured to receive a video signal from one or more participating/conferencing end-terminals (not shown) and to convert or compress the video signal for broadcasting or for transmitting to other participating user terminals. The television broadcasting systems 470 are configured to receive encoded video signals from one or more different broadcasting centers (or channels), to decode each video signal and to display the decoded video signals on a display device (not shown).

As shown in FIG. 4, the devices and systems 410-480 are coupled to the communication networks/channels 490. Communication networks/channels 490 supports an exchange of video signal encoded in accordance with one or more video encoding standards such as, but not limited to, H. 263, H. 264/AEC, and HEVC (high efficiency video coding) or H. 266, for example. Accordingly, the devices and systems 410-480 are required to process (encode and/or decode) video signals complying with such standards. The systems and devices 410-480 are implemented with one or more functional units that are configured to perform signal processing, transmitting and/or receiving of video signals from communication networks/channels 490. When each device in the described environment performs video coding or decoding, one or more embodiments described in this disclosure are used.

In the foregoing discussion, the terms "connected" means at least either a direct electrical connection between the devices connected or an indirect connection through one or more passive intermediary devices. The term "circuit" means at least either a single component or a multiplicity of passive or active components, that are connected together to provide a desired function. The term "signal" means at least one current, voltage, charge, data, or other signal. Also, the terms "connected to" or "connected with" (and the like) are intended to describe either an indirect or direct electrical connection. Thus, if a first device is coupled to a second device, that connection can be through a direct electrical connection, or through an indirect electrical connection via other devices and connections.

It should be noted that reference throughout this specification to features, advantages, or similar language does not imply that all of the features and advantages should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Further, the described features, advantages, and characteristics of the disclosure may be combined in any suitable manner in one or more embodiments. One skilled in the relevant art will recognize that the disclosure can be practiced without one or more of the specific features or advantages of a particular embodiment. In other instances, additional features and advantages may be recognized in certain embodiments that may not be present in all embodiments of the disclosure.

One having ordinary skill in the art will understand that the present disclosure, as discussed above, may be practiced with steps and/or operations in a different order, and/or with hardware elements in configurations which are different than those which are disclosed. Therefore, although the disclosure has been described based upon these preferred embodiments, it should be appreciated that certain modifications, variations, and alternative constructions are apparent and well within the spirit and scope of the disclosure. In order to determine the metes and bounds of the disclosure, therefore, reference should be made to the appended claims.

What is claimed is:

1. A noise filter comprising:
a motion estimation (ME) engine configured to receive a current frame and a reference frame, the current frame comprising a current block and the reference frame comprising a plurality of reference blocks, the ME engine configured to generate final motion vectors, the current block comprises a plurality of current pixels;
a motion compensation unit coupled to the ME engine and configured to generate a motion compensated block based on the final motion vectors and the reference frame, the motion compensated block comprises a plurality of motion compensated pixels;
a weighted average filter configured to multiply each current pixel of the plurality of current pixels and a corresponding motion compensated pixel of the plurality of motion compensated pixels with a first weight and a second weight respectively, wherein the product of the current pixels and the first weight is summed with the product of the corresponding motion compensated pixels and the second weight to generate a filtered block; and
a blockiness removal unit coupled to the weighted average filter and configured to remove artifacts in the filtered block,
wherein the ME engine is configured to estimate a cost function between the current block and the reference block, the cost function is estimated by summing the SAD, between the current block and the reference block, and a product of a motion smoothness value (MSV) and the motion vector cost between the current block and the reference block.

2. The noise filter of claim 1 further comprising a motion smoothness factor (MSF) engine coupled to the ME engine and configured to estimate the motion smoothness value (MSV) corresponding to the current block, wherein the MSV is estimated from a current noise level and the MSV is defined between a maximum MSV and a minimum MSV.

3. The noise filter of claim 2, wherein the MSV is equal to the minimum MSV when a sum of the motion vectors associated with the current block and the motion vectors associated with a set of adjacent blocks is above a predefined threshold.

4. The noise filter of claim 2, wherein the current noise level is estimated between the current frame and the reference frame by averaging SAD for all blocks with motion vectors below a predefined threshold.

5. The noise filter of claim 1, wherein the ME engine is configured to select a final SAD and the final motion vectors associated with the current block corresponding to a reference block of the plurality of reference blocks for which the cost function is minimum.

6. The noise filter of claim 5, wherein the ME engine is configured to estimate chrominance motion vectors associated with the current block, wherein the chrominance motion vectors are estimated from the final motion vectors and a last bit of the final motion vectors is masked with zero when the final motion vectors are odd.

7. The noise filter of claim 6, wherein the ME engine is configured to estimate a chrominance SAD between the current block and the reference block for which the cost function is minimum, the chrominance SAD is estimated from the chrominance motion vectors.

8. A noise filter comprising:
a motion estimation (ME) engine configured to receive a current frame and a reference frame, the current frame comprising a current block and the reference frame comprising a plurality of reference blocks, the ME engine configured to generate final motion vectors, the current block comprises a plurality of current pixels;
a motion compensation unit coupled to the ME engine and configured to generate a motion compensated block based on the final motion vectors and the reference frame, the motion compensated block comprises a plurality of motion compensated pixels;
a weighted average filter configured to multiply each current pixel of the plurality of current pixels and a corresponding motion compensated pixel of the plurality of motion compensated pixels with a first weight and a second weight respectively, wherein the product of the current pixels and the first weight is summed with the product of the corresponding motion compensated pixels and the second weight to generate a filtered block; and
a blockiness removal unit coupled to the weighted average filter and configured to remove artifacts in the filtered block, wherein the ME engine is configured to estimate a combined SAD associated with the current block by summing the final SAD and the chrominance SAD.

9. A noise filter comprising:
a motion estimation (ME) engine configured to receive a current frame and a reference frame, the current frame comprising a current block and the reference frame comprising a plurality of reference blocks, the ME engine configured to generate final motion vectors, the current block comprises a plurality of current pixels;
a motion compensation unit coupled to the ME engine and configured to generate a motion compensated block based on the final motion vectors and the reference frame, the motion compensated block comprises a plurality of motion compensated pixels;
a weighted average filter configured to multiply each current pixel of the plurality of current pixels and a corresponding motion compensated pixel of the plurality of motion compensated pixels with a first weight and a second weight respectively, wherein the product of the current pixels and the first weight is summed with the product of the corresponding motion compensated pixels and the second weight to generate a filtered block;
a blockiness removal unit coupled to the weighted average filter and configured to remove artifacts in the filtered block; and
a weight computation unit coupled to the ME engine and configured to estimate the first weight and the second weight using a combined SAD associated with the current block, an average combined SAD associated with a previous frame and a blending factor.

10. The noise filter of claim 9, wherein the blending factor for a motion block is lower than the blending factor for a static block.

11. The noise filter of claim 9, wherein the blending factor is defined between a maximum blending factor and a minimum blending factor such that the blending factor for the motion block is minimum blending factor and the blending factor for the static block is between the maximum blending factor and the minimum blending factor.

12. A noise filter coupled to a spatial filter, the noise filter comprising:
a motion estimation (ME) engine configured to receive a current frame and a reference frame, the current frame comprising a current block and the reference frame comprising a plurality of reference blocks, the ME engine configured to generate final motion vectors, the current block comprises a plurality of current pixels;
a motion compensation unit coupled to the ME engine and configured to generate a motion compensated block based on the final motion vectors and the reference frame, the motion compensated block comprises a plurality of motion compensated pixels;
a weighted average filter configured to multiply each current pixel of the plurality of current pixels and a corresponding motion compensated pixel of the plurality of motion compensated pixels with a first weight and a second weight respectively, wherein the product of the current pixels and the first weight is summed with the product of the corresponding motion compensated pixels and the second weight to generate a filtered block; and
a blockiness removal unit coupled to the weighted average filter and configured to remove artifacts in the filtered block, the spatial filter comprising:
a median filter configured to receive a filtered pixel of the plurality of filtered pixels from the noise filter and configured to generate a median pixel;
a subtractor coupled to the median filter and configured to subtract the median pixel from the filtered pixel to generate a subtracted pixel;
a soft coring unit configured to receive the subtracted pixel and a noise function, the noise function is estimated from the current noise level, the soft coring unit configured to perform a soft coring function on the subtracted pixel and generates an adjusted pixel; and
an adder coupled to the soft coring unit and configured to sum the adjusted pixel and the median pixel to generate a spatial filtered pixel.

13. A method of filtering noise comprising:
generating final motion vectors from a current frame and a reference frame, wherein the current frame comprises a current block and, the current block comprises a plurality of current pixels and the reference frame comprises a plurality of reference blocks;
generating a motion compensated block based on the final motion vectors and the reference frame, the motion compensated block comprises a plurality of motion compensated pixels;
generating a filtered block by summing a product of the current pixels and a first weight and a product of corresponding motion compensated pixels and a second weight, the filtered block comprises a plurality of filtered pixels;
removing artifacts in the filtered block; and
storing the filtered block, wherein generating the final motion vectors comprises:

estimating a motion smoothness value (MSV) corresponding to the current block based on a current noise level;
estimating a sum of absolute difference (SAD) between the current block and a reference block;
estimating a motion vector cost between the current block and the reference block;
estimate a cost function between the current block and the reference block by summing the SAD, between the current block and the reference block, and a product of the MSV and the motion vector cost between the current block and the reference block; and
selecting a final SAD and motion vectors associated with the current block corresponding to a reference block of the plurality of reference blocks for which the cost function is minimum.

14. A method of filtering noise comprising:
generating final motion vectors from a current frame and a reference frame, wherein the current frame comprises a current block and, the current block comprises a plurality of current pixels and the reference frame comprises a plurality of reference blocks;
generating a motion compensated block based on the final motion vectors and the reference frame, the motion compensated block comprises a plurality of motion compensated pixels;
generating a filtered block by summing a product of the current pixels and a first weight and a product of corresponding motion compensated pixels and a second weight, the filtered block comprises a plurality of filtered pixels;
removing artifacts in the filtered block;
storing the filtered block;
estimating a chrominance SAD between the current block and the reference block;
estimating a combined SAD associated with the current block by summing the final SAD and the chrominance SAD; and
estimating the first weight and the second weight using the combined SAD associated with the current block, an average SAD associated with a previous frame and a blending factor.

15. A method of filtering noise comprising:
generating final motion vectors from a current frame and a reference frame, wherein the current frame comprises a current block and, the current block comprises a plurality of current pixels and the reference frame comprises a plurality of reference blocks;
generating a motion compensated block based on the final motion vectors and the reference frame, the motion compensated block comprises a plurality of motion compensated pixels;
generating a filtered block by summing a product of the current pixels and a first weight and a product of corresponding motion compensated pixels and a second weight, the filtered block comprises a plurality of filtered pixels;
removing artifacts in the filtered block;
storing the filtered block;
generating a median pixel from a filtered pixel of the plurality of filtered pixels;
subtracting the median pixel from the filtered pixel to generate a subtracted pixel;
estimating a noise function from a current noise level;
performing a soft coring function on the subtracted pixel to generate an adjusted pixel, wherein the soft coring function is estimated from the noise function; and
summing the adjusted pixel and the median pixel to generate a spatial filtered pixel.

\* \* \* \* \*